Patented Sept. 4, 1934

1,972,177

UNITED STATES PATENT OFFICE 1,972,177

DYESTUFF OF THE THIOINDIGO SERIES

Franz Wieners, Opladen, Germany, assignor to General Aniline Works, Inc., New York, N. Y., a corporation of Delaware No Drawing. Application December 19, 1931, Serial No. 582,173. In Germany December 27, 1930

5 Claims. (Cl. 260—53)

The present invention relates to a process of preparing symmetrically constituted dyestuffs of the thioindigo series.

In accordance with the invention a compound of the general formula:—

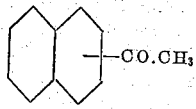

in which the naphthalene nucleus may be substituted by monovalent substituents, more particularly alkyl groups, alkoxy groups, nitro groups, or halogen atoms, is caused to react with a sulfur halide, such as sulfur mono- or dichloride, sulfur bromide etc. It is advantageous, but not necessary to add to the reaction mixture an organic solvent inert to the starting materials. The reaction performs in two steps. The first reaction already begins at low temperatures (room temperature or even substantially lower) and finishes with the formation of intermediate products of unknown structure. These intermediate products generally form resinous or smeary compounds, which soon solidify and can then be pulverized to colorless or weakly colored powders. They are difficultly soluble in, for example, glacial acetic acid, ligroin, but generally soluble in solvents of the aromatic series, such as benzene, toluene, nitrobenzene, chlorobenzenes etc.

The intermediate products separate from the reaction mixture when a solvent in which the intermediate products are insoluble or difficultly soluble has been applied, or when no solvent at all has been used. Otherwise, the intermediate products can be separated from the reaction mixture by the addition of ligroin, glacial acetic acid or the like. Suitable solvents for performing the reaction are, for example, benzene, nitrobenzene, chlorobenzene, ligroin, glacial acetic acid, etc.

If it is intended to isolate the intermediate products, a temperature substantially above about 80° C. should not be applied.

When heating the intermediate products in the presence or absence of an organic solvent to a temperature above about 100° C., the intermediate products decompose with the formation of symmetrically constituted vat dyestuffs of the thioindigo series. Higher temperatures are operable, and I prefer to apply temperatures between about 140° and about 250° C., at which temperatures reaction performs rather quickly (within half an hour, for example).

If a solvent is applied in this second step of the formation of thioindigos, it is obviously advantageous to use a rather high boiling one, such as naphthalene, nitrobenzene, chlorobenzene, ortho-dichlorobenzenes etc.

Obviously, it is not necessary to isolate the intermediate products above mentioned, but the formation of the dyestuffs of the thioindigo series may be combined with the formation of the intermediate products to one step of working. In this case an organic solvent boiling above about 100° C. and being inert to the starting materials is advantageously applied, and after the addition of the sulfur halide the reaction mixture is slowly heated to above about 100° C., advantageously to a temperature between about 140° and about 250° C. The dyestuffs formed separate from the reaction mixture, after cooling in most cases, otherwise the reaction may be worked up by the addition of a solvent in which the dyestuffs are insoluble or difficultly soluble, filtering and washing.

The following examples illustrate the invention, without however, restricting it thereto:—

Example 1

56 parts by weight of alpha-naphthylmethylketone are mixed with the equimolecular quantity or somewhat more of sulfur monochloride in 150 parts by weight of nitrobenzene and heated to 90° C. The reaction soon commences and when it has subsided, the temperature is raised to about 140–150° C., and this temperature is maintained for some hours. Needles of 2.1-naphthoxythiophene-indigo soon begin to separate. After completion of the reaction, the mixture is allowed to cool, the dyestuff filtered by suction and washed with nitrobenzene and then with a little alcohol. The dyestuff possesses the properties described by Friedländer in Annalen 388, page 16. The nitrobenzene may be replaced by glacial acetic acid, chlorobenzene, trichlorobenzene and other solvents with a similar result.

Example 2

10 parts by weight of beta-naphthylmethylketone are dissolved in 50 parts by weight of ortho-dichlorobenzene and the equimolecular quantity of sulfur monochloride is added. The reaction mixture is heated to 60° C., until the first reaction ceases, and the temperature is then quickly raised to 160–170° C. The dyestuff soon begins to separate from the reaction mixture in long needles while still hot. When the precipitation no longer increases, which is the case after about one hour, the mixture is allowed to cool and filtered by suction. After washing with ortho-dichlorobenzene and a little alcohol, shining reddish-brown needles of the very pure dyestuff remain. On account of its properties the dyestuff is presumably identical with the 1.2-naphthoxy-thiophene-indigo described by Friedländer in Annalen 388, page 18.

*Example 3*

28 parts by weight of 2-acetylnaphthalene are dissolved while stirring in about 100 parts by weight of ligroin and this solution is mixed with the calculated quantity of sulfur monochloride. After about ½ to 1½ hours a light resin begins to separate, the formation of which prevents further stirring. After about 24 hours the separation is finished. The excess of the ligroin is filtered off or decanted, the compound washed several times with ligroin, and the brittle mass finally obtained is pulverized. The light powder obtained is stirred in portions within ¾ of an hour into 250 parts by weight of nitrobenzene at 200° C., whereupon the dyestuff is formed with vigorous foaming (separation of HCl, H₂S and H₂O). This dyestuff is identical with that obtained according to Example 2. The working up is effected according to the method described in Example 2.

In the same manner a mixture of alpha- and beta-naphthylmethylketone can be worked up, which mixture is obtained by condensing naphthalene in carbon disulfide, benzene, dichlorobenzene or another similar solvent with acetylchloride, by means of anhydrous aluminium chloride. In this case a mixture of the dyestuffs obtained according to Examples 1 and 2 is formed.

*Example 4*

30 parts by weight of 1-methoxynaphthalene-4-methylketone are dissolved in 75 parts by weight of glacial acetic acid and mixed while stirring with the calculated quantity of sulfur monochloride at a temperature of about 20° C. Stirring is continued as long as possible, that is, as long as the formation of a brittle resin, which soon begins, permits the stirring of the reaction mixture. The latter is then allowed to stand overnight, and the intermediate product is isolated and pulverized as described in Example 3, whereupon it is stirred into 250 parts by weight of nitrobenzene at 200° C. within 1 hour. Stirring is continued for another hour, whereupon the dyestuff is obtained by filtering with suction at a temperature of 50° C. in beautiful orange brown needles. The dyestuff is washed with some pyridine and alcohol and dried.

The dyestuff dissolves in sulfuric acid with a bluish-green coloration. From this solution it is precipitated with water in yellowish-brown flakes.

Acetyl-1-chlornaphthalene treated in the same manner yields a similar somewhat darker brown dyestuff.

In the above examples the naphthalene derivatives may be substituted, for example, by the product obtainable by reacting upon 1-methylnaphthalene with acetylchloride in the presence of aluminium chloride, or by the product obtainable by nitrating 1- or 2-acetyl naphthalene, whereby thioindigos substituted by alkyl- or nitro groups are formed.

The amount of the sulfur halide used in the above examples may be lowered or raised, whereby in the former case the yield of the reaction products lowers, whereas in the latter case the reaction products are often somewhat contaminated.

I claim:—

1. The process which comprises heating a compound of the general formula

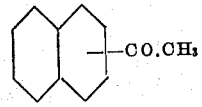

wherein the naphthalene nucleus may be substituted by alkyl-, alkoxy-, nitro groups or halogen atoms, with a sulfur halide to a temperature above about 100° C.

2. The process which comprises heating a compound of the general formula

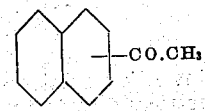

wherein the naphthalene nucleus may be substituted by alkyl-, alkoxy-, nitro groups or halogen atoms, with a sulfur halide to a temperature above about 100° C., in the presence of an organic solvent being inert to the starting materials and having a boiling point above about 100° C.

3. The process which comprises heating a compound of the general formula

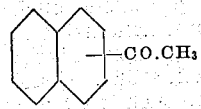

wherein the naphthalene nucleus may be substituted by alkyl-, alkoxy-, nitro groups or halogen atoms, with a sulfur halide to a temperature between about 140 and about 250° C. in the presence of an organic solvent being inert to the starting materials and having a boiling point above about 100° C.

4. The process which comprises heating a compound of the general formula

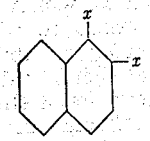

wherein one $x$ means hydrogen and the other $x$ the grouping —CO.CH₃, with a sulfur halide to a temperature between about 140 and about 250° C. in the presence of an organic solvent being inert to the starting materials and having a boiling point above about 100° C.

5. The process which comprises heating a compound of the general formula

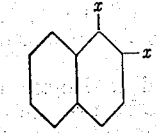

wherein one $x$ means hydrogen and the other $x$ the grouping —CO.CH₃, with sulfur monochloride to a temperature between about 140 and about 250° C. in the presence of an organic solvent being inert to the starting materials and having a boiling point above about 100° C.

FRANZ WIENERS.